United States Patent
Caillot et al.

(10) Patent No.: US 9,623,843 B2
(45) Date of Patent: Apr. 18, 2017

(54) HEATING DEVICE INTENDED FOR A WINDSCREEN WIPER AND WINDSCREEN WIPER HAVING SUCH A HEATING DEVICE

(71) Applicant: Valeo Systèmes d'Essuyage, Le Mesnil Saint Denis (FR)

(72) Inventors: Gérald Caillot, Cernay la Ville (FR); Vincent Izabel, Chilly Mazarin (FR); Jean-Michel Jarasson, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 323 days.

(21) Appl. No.: 14/309,071

(22) Filed: Jun. 19, 2014

(65) Prior Publication Data
US 2014/0373297 A1    Dec. 25, 2014

(30) Foreign Application Priority Data
Jun. 20, 2013 (FR) ...................................... 13 55852

(51) Int. Cl.
*B60S 1/38* (2006.01)

(52) U.S. Cl.
CPC ........... *B60S 1/3805* (2013.01); *B60S 1/3848* (2013.01); *B60S 1/3862* (2013.01); *B60S 2001/382* (2013.01); *B60S 2001/3898* (2013.01); *Y10T 29/49117* (2015.01)

(58) Field of Classification Search
CPC .............................. B60S 1/3805; B60S 1/3803
USPC ......................................... 15/250.05, 250.07
See application file for complete search history.

(56) References Cited

U.S. PATENT DOCUMENTS

2012/0117746 A1*   5/2012   Egner-Walter ........ B60S 1/3805
                                                                15/250.06

FOREIGN PATENT DOCUMENTS

| FR | 2 911 834 A1 | 8/2008 | |
| FR | DE 102009032375 A1 * | 1/2011 | ............ B60S 1/3805 |
| FR | DE 102011055948 A1 * | 6/2013 | ............ B60S 1/3805 |
| WO | 2011/003613 A1 | 1/2011 | |

OTHER PUBLICATIONS

DE102009032375A1 (machine translation), 2011.*
DE102011055948A1 (machine translation), 2013.*
Office Action issued in corresponding Mexican Application No. MX/a/2014/007478 dated Aug. 14, 2015, and English translation thereof (4 pages).

* cited by examiner

*Primary Examiner* — Andrew A Horton
(74) *Attorney, Agent, or Firm* — Osha Liang LLP

(57) ABSTRACT

Heating device (20) that is able to be mounted on a support frame of a windscreen wiper, the heating device (20) having a vertebra (24) that is able to be mounted longitudinally inside the housing in the support frame; at least one heating element (25) disposed on the vertebra (24); an electrical connector (26) comprising an electrical connection device; characterized in that the heating device (20) comprises an electrically conductive protruding element (28) in electrical contact with the heating element (25), and in that the heating device (20) is able to prevent the electrical connection device (27) from coming into contact with the heating element (25) before the vertebra (24) is in its final mounted position; and to bring the electrical connection device (27) and the protruding element (28) into contact when the vertebra (24) is in its final mounted position.

13 Claims, 4 Drawing Sheets

HEATING DEVICE INTENDED FOR A WINDSCREEN WIPER AND WINDSCREEN WIPER HAVING SUCH A HEATING DEVICE

The present invention concerns a heating device intended to be fitted to a windscreen wiper and also the windscreen wiper having such a heating device.

It relates in particular to a heating device comprising a structural element such as a vertebra on which a heating element is disposed.

The present invention also concerns a method for fitting a heating device of the abovementioned type to a wiper connector intended to be articulated to a windscreen wiper actuating arm, while ensuring an electrical connection between the heating device and the wiper connector following fitting.

Patent document FR 2 911 834 in the name of the Applicant describes a non-heating windscreen wiper of the type known as a "flat blade". As is shown in FIG. 1, a windscreen wiper 1 having a single vertebra of this type comprises:
- a support frame 2 having a longitudinally extending tubular body 3 which has means for connecting a squeegee blade 4;
- a vertebra 5 disposed inside the tubular body 3; and
- a one-piece wiper connector 6 for connecting the wiper 1 to an actuating arm.

The elements of the wiper 1 are assembled by carrying out the following steps in succession:
- mounting the wiper connector 6 on the support frame 2, the wiper connector 6 being inserted into an orifice 7 in the tubular body 3, by way of a vertical sliding movement from top to bottom if the orientations vertical, longitudinal and transverse as per the reference frame V, L, T indicated in FIG. 1 are adopted;
- introducing the vertebra 5 into the interior of the tubular body 3, the vertebra 5 being introduced at one of the longitudinal ends of the tubular body 3;
- longitudinally sliding the vertebra 5 into its final position.

Furthermore, windscreen wipers comprising heating elements can be installed on vehicles in order in particular to de-ice the wiper in the event of very cold weather and to prevent it from being stuck to the windscreen by ice, or to heat the manifolds for feeding and dispensing a cleaning and/or de-icing fluid that are included in the wiper.

Typically, as is shown in FIGS. 2 and 3, a prior art heated windscreen wiper 8 has:
- two heating films 9 having electrically resistive elements;
- two vertebrae, in the form of blades, on each of which a heating film 9 is disposed;
- a longitudinally extending squeegee blade 10;
- a longitudinally extending shaped part, commonly known as a "spoiler" 11, which is held by the two vertebrae on each of which the heating film 9 is disposed, the squeegee blade 10 extending along one of the longitudinal faces of this shaped part 11 in the connected position and the two vertebrae being held by a wiper connector 12.

This windscreen wiper 8 is articulated to an actuating arm by way of an adapter that is connected on one side to said arm and on the other side to this wiper connector 12, which is itself connected to said wiper 8.

The wiper connector 12 connects the intake pipe (not shown) that is connected to a source of cleaning and/or de-icing fluid to at least one manifold (not shown) for feeding and dispensing said fluid included in the wiper 8. The wiper connector 12 thus has two pairs 19, 19' of outlet connectors that are intended to feed cleaning and/or de-icing fluid to at least two manifolds.

The wiper connector 12 has an electrical connector 13 connected to the electrical circuit of the vehicle, the wiper connector 12 comprising two terminals 14 which are each substantially in the form of a sideways "U" and to which the electrical connector 13 is connected.

In the fitted position, the electrical connector 13 is connected to the heating film 9 by means of an electrical connection device 15 which has two metal parts 16 that are substantially in the form of tabs and extend vertically with respect to the heating film 9, these metal parts 16 each being able to be inserted into the slot delimited by each terminal 14 in order to provide a connection known as a fork-type connection. Each of these metal parts 16 comprises a pair of electrically conductive feet 17 that are each substantially in the form of a tab comprising at its end a shoe 18 in contact with a heating film 9.

It has been found that the structure of a heated windscreen wiper such as the one shown in FIGS. 2 and 3 does not make it possible for the vertebra to be mounted in a tubular body by imparting a sliding movement thereon as described in the patent document FR 2 911 834. Specifically, the contact of the shoes of an electrical connection device with the heating film, in the case of sliding of the vertebra in a tubular body, would risk causing deformation of the heating film and/or deterioration of the contact face of the shoe that has undergone a surface treatment, thereby impairing the effectiveness of the electrical contact between the shoe and the heating film.

The object of the present invention is to remedy these drawbacks by proposing a heating device that is included in a windscreen wiper and also the windscreen wiper having such a heating device, the structure of which makes it possible to fit by sliding the vertebra on which a heating element is disposed, without impairing the structure of the elements of which the windscreen wiper is made.

To this end, the invention proposes a heating device that is able to be fitted to a support frame of a windscreen wiper by sliding in a longitudinal housing in the support frame, the heating device having:
- at least one vertebra that is able to be mounted longitudinally inside the housing in the support frame;
- at least one heating element disposed on the vertebra;

characterized in that the heating device comprises an electrically conductive protruding element in electrical contact with the heating element.

In the final mounted position, the vertebra is disposed wholly or virtually wholly in the housing of the support frame.

Preferably, the vertebra is substantially in the form of a longitudinal blade with a rectangular section, which has two opposite longitudinal large faces, one of these longitudinal large faces comprising the electrically conductive protruding element.

Preferentially, the heating element is a heating film.

The heating element may also be, in particular, but not exclusively, heating wires or a layer of resistive paint.

Preferentially, the electrical connection device is flexible in order to optimize contact with the protruding element.

The present invention also relates to a windscreen wiper, characterized in that it comprises:
- a heating device according to the invention;
- a support frame with a longitudinal main axis, which has:
  - a longitudinal housing which opens out at least at one of the longitudinal ends of the support frame;
  - holding means for holding a squeegee blade;

a squeegee blade;

a wiper connector that is able to connect the wiper to an actuating arm of a wiper device, this connector being mounted on the support frame.

The wiper connector of the wiper may be hydraulic and comprise at least one manifold for feeding and dispensing a cleaning and/or de-icing fluid that is intended to be sprayed onto the contact surface of the squeegee blade.

Advantageously, the wiper connector comprises an electrical connector housed in this wiper connector and an electrical connection device.

Preferentially, the electrical connection device comprises a curved electrically conductive wire that forms a sliding contact and is able to cooperate with the protruding element.

According to a variant embodiment of the invention, the electrical connection device comprises a spring-mounted half-sphere that forms a sliding contact and is able to cooperate with the protruding element so as to maintain electrical contact.

According to another variant embodiment of the invention, the electrical connection device is fixed to the electrical connector in a disconnectable manner.

The present invention also relates to a wiper device, characterized in that it comprises a windscreen wiper according to the invention.

The present invention also relates to a method for assembling a windscreen wiper according to the invention, characterized in that it comprises the following steps of:

mounting the wiper connector on the support frame of the windscreen wiper;

introducing the vertebra into the interior of the housing of the support frame, the vertebra being introduced at one of the longitudinal ends of said support frame;

longitudinally sliding the vertebra into its final position, the electrical connection device of the electrical connector then being in electrical contact with the protruding element of the heating device.

Preferentially, the heating device is able:

to prevent the electrical connection device from coming into contact with the heating element before the vertebra is in its final mounted position;

to bring the electrical connection device and the protruding element into contact when the vertebra is in its final mounted position.

In this way, the absence of contact between the electrical connection device of the electrical connector and the heating element during the sliding of the vertebra into the housing of the support frame prevents deformation of the heating element and/or deterioration of the contact face of the electrical connection device.

Advantageously, the wiper connector and the electrical connector are a one-piece part, manufactured in one moulding step.

Further features and advantages of the present invention will become apparent in the light of the following examples and the appended figures, said examples and figures being given by way of nonlimiting illustration.

FIG. 1, already described, is an exploded perspective illustration of a windscreen wiper of the "flat blade" type comprising a single vertebra, and of a mechanical wiper connector of the prior art.

FIG. 2, already described, is a perspective illustration of a heated windscreen wiper comprising two vertebrae, and of a hydraulic wiper connector of the prior art.

FIG. 3, already described, is an illustration of an electrical connection device of the windscreen wiper shown in FIG. 2.

Figure 1:
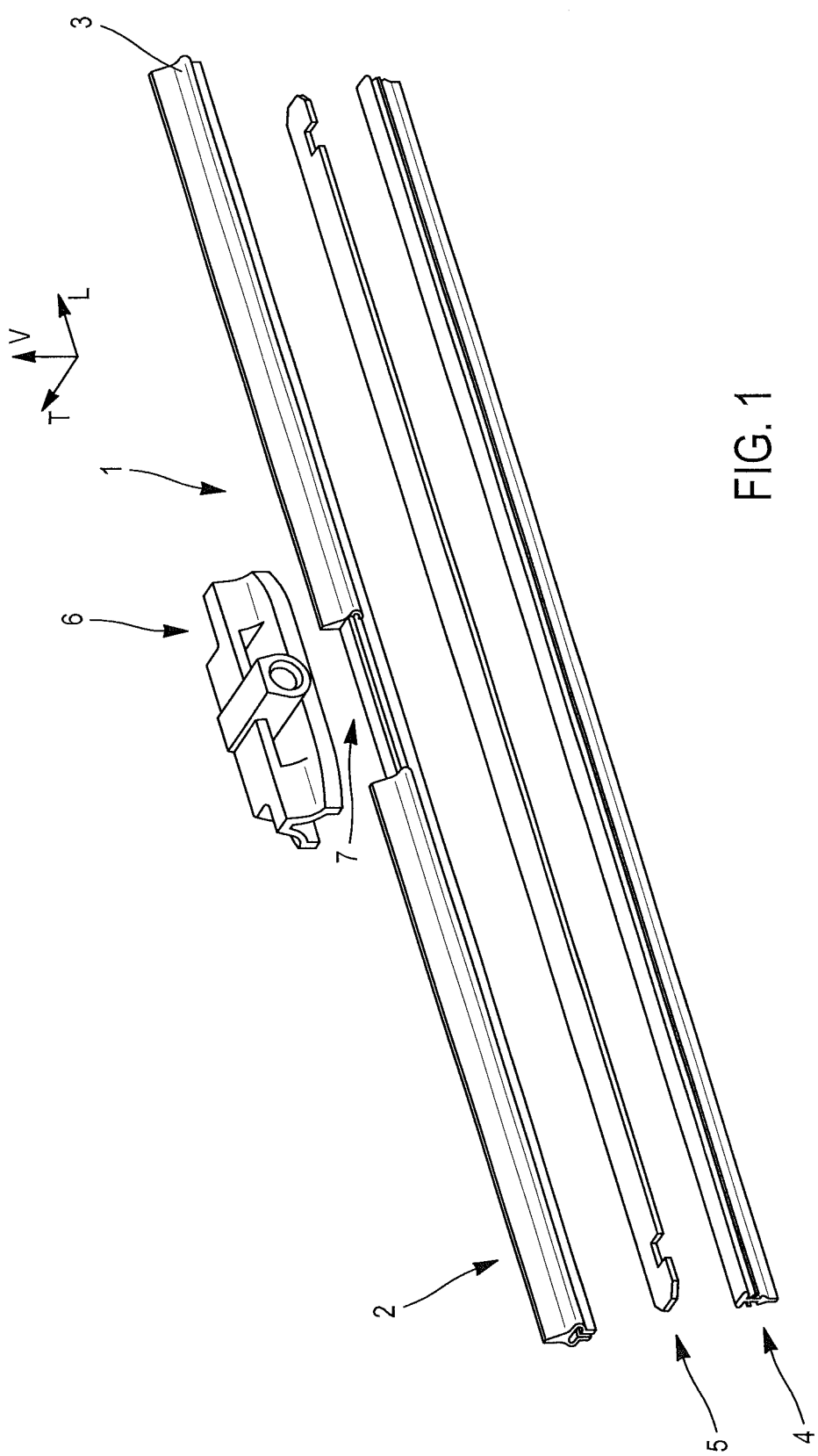
Figure 2:
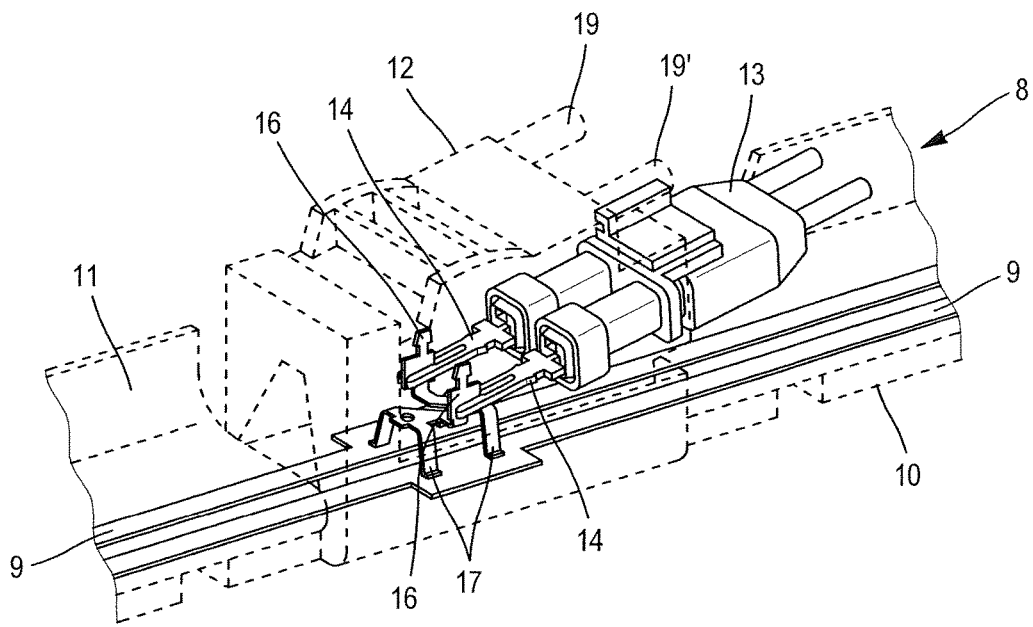
Figure 3:
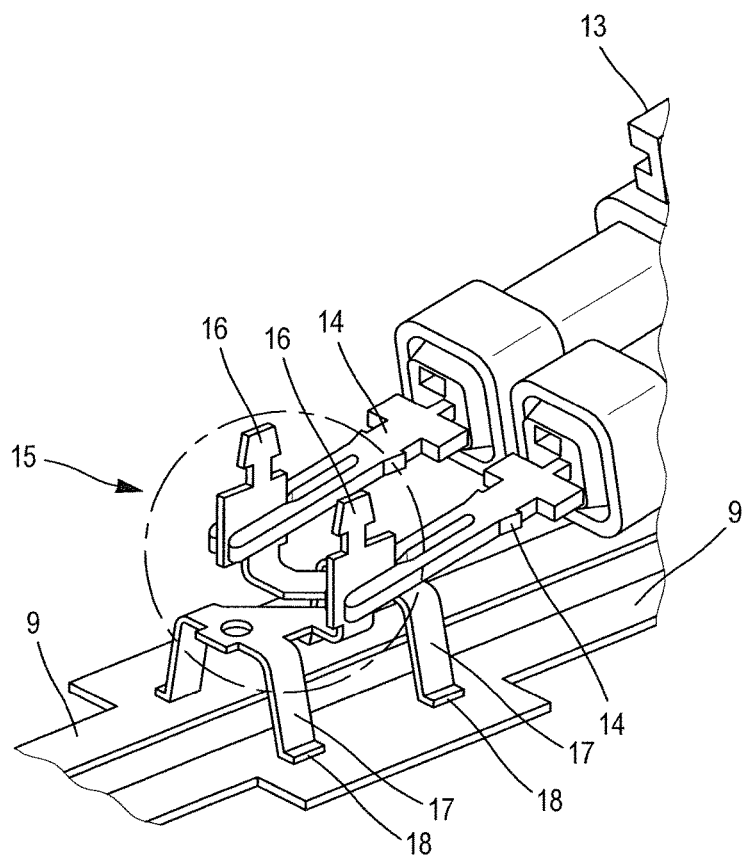
Figure 4:
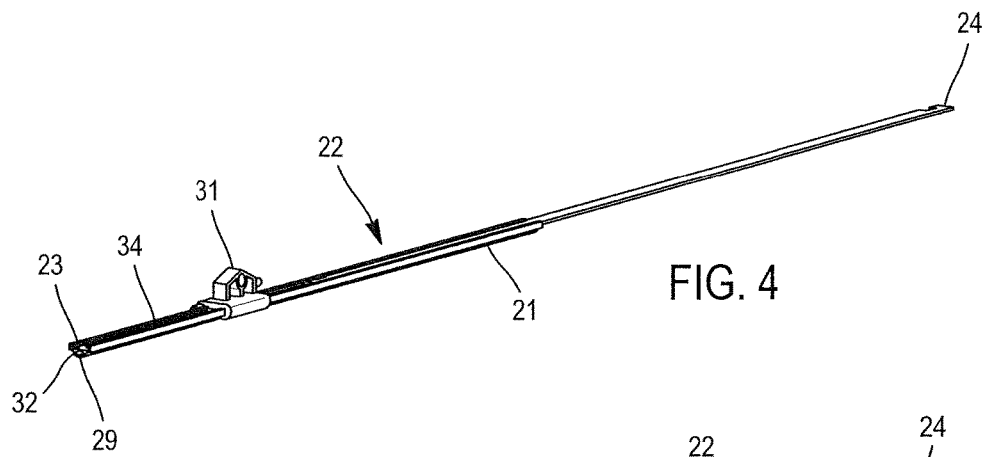
FIG. 4 is a perspective illustration of a windscreen wiper according to the invention, the vertebra and the support frame of which are in the course of being assembled.

As shown in FIGS. 4 to 7, the heating device 20 according to the invention has a vertebra 24 that is able to be mounted longitudinally inside the housing 23 of a support frame 21 of a windscreen wiper 22.

The vertebra 24 is approximately in the form of a longitudinal blade with a rectangular section which has two opposite longitudinal large faces.

The vertebra 24 is made of a relatively rigid material such as steel in order to stiffen the support frame 21.

Moreover, the vertebra 24 may comprise at least one lateral notch 40 located close to one of its longitudinal ends, which is able to engage with a protrusion (not shown) on the support frame 21. The vertebra 24 may also have at least one lateral notch (not shown) disposed approximately in the middle of a longitudinal edge of the vertebra 24, this notch engaging with another protrusion (not shown) on the wiper connector 31 in order to prevent the vertebra 24 from moving in translation with respect to the wiper connector.

A heating element 24 is disposed on one of the longitudinal large faces of the vertebra 24. This heating element 25 is a heating film which may be composed of at least one conductive metal tape disposed between at least two sheets made of electrically insulating materials.

The term disposed is understood here to mean in physical contact, that is to say that the heating element is in physical contact over its entire surface with the vertebra.

Figure 6:
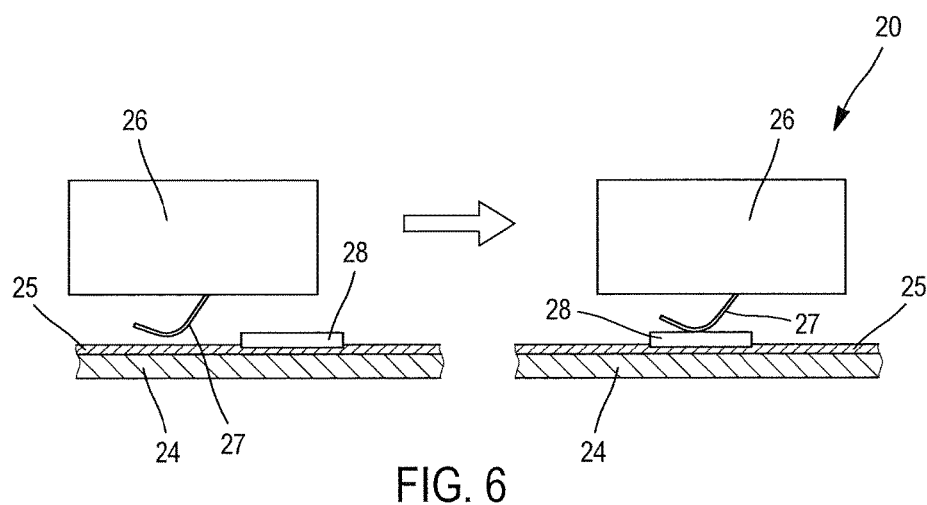
FIG. 6 is a schematic illustration of a heating device according to the invention and of a wiper connector during assembly and in the assembled position.
Figure 7:
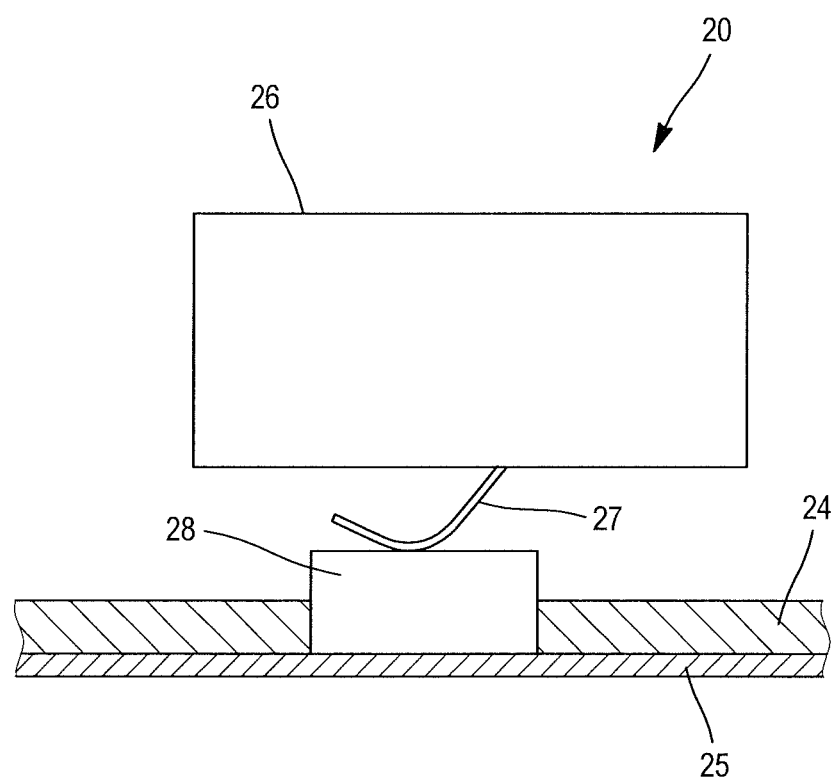
FIG. 7 is a schematic and partial illustration of a heating device according to a variant embodiment of the invention and of a wiper connector, in the assembled position.

The heating element 25 could just as easily be disposed on the upper face of the vertebra 24, as is shown in FIG. 6, or on the lower face of the vertebra 24, as is shown in FIG. 7. The terms upper and lower in relation to the vertebra 24 are defined once the vertebra is mounted in a housing of a support frame 21 with a longitudinal main axis which will be described later.

The lower face of the vertebra 24 is the face located opposite the connection means 29 of the squeegee blade once the vertebra has been inserted in the support frame 21.

The upper face of the vertebra 24 is the face located opposite the wiper connector 31 once the vertebra has been inserted in the support frame 21.

The longitudinal face on which the heating element 25 is disposed also comprises a protruding element 28 that is raised from the upper face of the vertebra 24 and is in electrical contact with the heating element 25, this protruding element 28 being made of an electrically conductive material.

As is shown in FIG. 6, the protruding element 28, which has a substantially parallelepipedal shape of width A, is disposed on the heating element 25 at a location where the heating film is not provided with the upper insulating film in order to allow electrical contact with the metal tape.

In the case in FIG. 7, the protruding element 28, which also has a substantially parallelepipedal shape, is disposed on the heating element 25 at a location where the heating film is not provided with the upper insulating film in order to allow electrical contact with the metal tape. The protruding element 28 thus passes through a recess in the vertebra 24 in order that this protruding element 28 is raised from the upper face of the vertebra 24.

The vertebra 24 is intended to be inserted into the housing 23 of a support frame 21 with a longitudinal main axis, this frame 21 having:
- the longitudinal housing 23, which opens out at least at one of the longitudinal ends of the support frame 21;
- holding means 29 for holding a squeegee blade.

The support frame 21 also comprises a longitudinal core 32 separating the longitudinal housing 23 and the holding means 29.

The longitudinal housing 23 is delimited by the longitudinal core 32 of width B and by two walls 33 that each extend a longitudinal edge of the core 32, each wall 33 comprising:
- a first part extending transversely with respect to said core 32;
- a second part that defines a bend, the two bends of the walls 33 returning towards one another parallel to said core 32 so as to delimit a longitudinal slot 34;

the housing 23 being symmetrical with respect to the transverse mid-axis of said core 32.

In this way, the core 32 and the bends prevent the vertebra 24 from moving in the housing 23 in a direction approximately orthogonal to the core 32.

The holding means 29 for holding the squeegee blade may consist for example of two longitudinal hooks disposed opposite one another, delimiting a second longitudinal housing (not shown) the shape of which matches the upper end of the squeegee blade. In this way, once the upper end of the squeegee blade has been introduced into the second housing, the squeegee blade slides longitudinally into its final position.

The wiper 22 is connected to the actuating arm (not shown) of a windscreen wiper by means of the wiper connector 31 and an axle hole 35 allowing the wiper to rotate with respect to the actuating arm.

The wiper connector 31 also carries out the function of transporting and dispensing a windscreen washing/de-icing liquid. To this end, the wiper connector 31 comprises a hydraulic circuit consisting of an inlet pipe 41, an internal duct (not shown) in which the liquid circulates in order to be dispensed at the windscreen wiper via sprayer manifolds (not shown) on each side of the mechanical connector by outlet pipes 42 and 43. The manifolds are included in the wiper 22 and are in the form of aerodynamic deflectors clip-fastened to the support frame 21.

The windscreen wiper 22 also comprises an electrical connector 26 mounted in the wiper connector 31, said electrical connector 26 being connected to the electrical circuit of the vehicle. This electrical connector 26 transmits the electrical current coming from the electrical circuit of the vehicle to the protruding element 28.

The wiper connector 31 comprises the electrical connection device 27 connected to the electrical connector 26, this connector 26 being itself connected to the actuating arm of the windscreen wiper. The electrical connection device 27 extends at least partially outside the internal space of the wiper connector 31.

As is shown in FIG. 6, this electrical connection device 27 comprises a curved electrically conductive wire or strip that forms a sliding contact and is able to cooperate with the protruding element 28 so as to maintain electrical contact.

The curved shape of the sliding contacts ensures electrical contact with the protruding element 28 regardless of the angular position of the wiper 22 and its wiper connector 31 with respect to the arm. This wire or strip may be flexible in order to optimize electrical contact with the protruding element 28.

According to a variant embodiment of the invention, the electrical connection device 27 may comprise a spring-mounted half-sphere that forms a sliding contact and is able to cooperate with the protruding element 28 so as to maintain electrical contact.

The electrical connection device 27 is fixed to the electrical connector 26 in a disconnectable manner. By way of example, the electrical connection device 27 is fixed to the electrical connector by clip-fastening.

The electrical connection device 27 may also be fixed to the electrical connector 26 by riveting or crimping.

The wiper connector 31 is longitudinally mounted approximately in the middle of the support frame 21.

According to a variant embodiment of the invention, the wiper connector 31 comprises two longitudinally extending lateral lugs which are able to engage with an orifice in the support frame 21 such as the one in the windscreen wiper that is the subject of patent document FR 2 911 834. The wiper connector 31 is thus inserted into this orifice, by way of a vertical sliding movement, said lateral lugs gripping the longitudinal edges of the support frame 21.

The heating device 20 is fitted to the wiper connector 31 by implementing the following steps:
- mounting the wiper connector 31 on the support frame 21 of the windscreen wiper 22;
- introducing the vertebra 24 on which the heating element 25 is disposed into the interior of the housing 23 of the support frame 21, the vertebra 24 being introduced at one of the longitudinal ends of said support frame 21;
- longitudinally sliding the vertebra 24 into its final position, the electrical connection device 27 of the electrical connector 26 then being in electrical contact with the protruding element 28 of the heating device 20.

Figure 5:
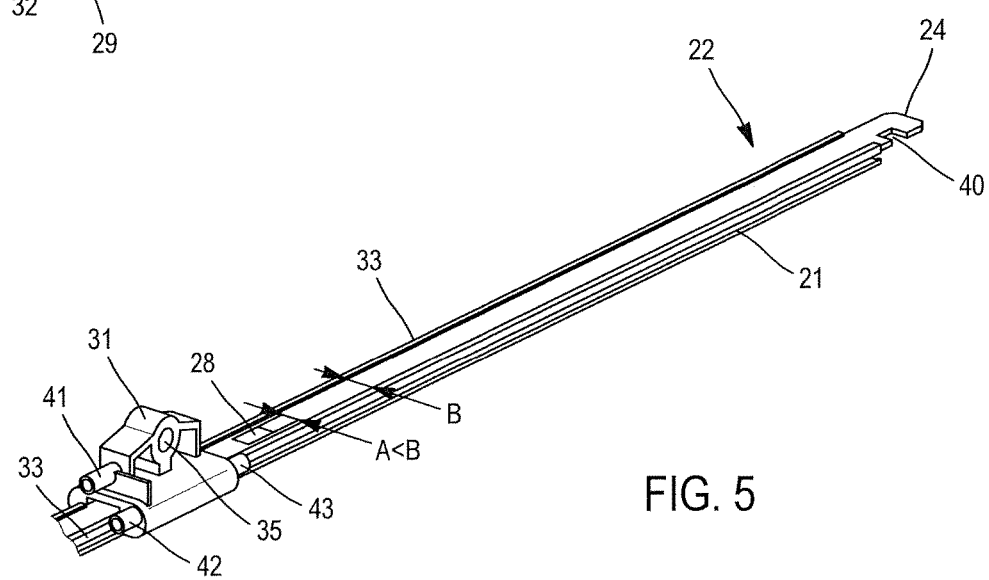
FIG. 5 is a perspective illustration of a windscreen wiper according to the invention, the vertebra of which is fitted in the support frame.

As can be seen in FIG. 5, the width A of the protruding element 28 is less than the width B of the longitudinal core 32 in order to make it easier to slide the vertebra 24 in the support frame 21 and thereby avoid any contact between the protruding element and the longitudinal frame.

Advantageously, during the sliding of the vertebra 24, the electrical connection device 27 and the heating element 25 do not come into contact.

The invention claimed is:

1. A heating device fitted to a support frame of a windscreen wiper by sliding in a longitudinal housing in the support frame, the heating device comprising:
    at least one vertebra elongated in a longitudinal direction, the at least one vertebra mounted longitudinally inside the housing in the support frame;
    at least one heating element disposed on the vertebra; and
    an electrically conductive protruding element in electrical contact with the at least one heating element,
    wherein the electrically conductive protruding element forms a sliding contact with an electrical connection device, the vertebra is configured to be slid inside the housing in the longitudinal direction in order to provide contact of the protruding element with the electrical connection device,
    wherein the sliding contact is parallel to a longitudinal length of the longitudinal housing.

2. The heating device according to claim 1, wherein the vertebra is substantially in the form of a longitudinal blade with a rectangular section having two opposite longitudinal large faces, one of the longitudinal large faces comprising the electrically conductive protruding element.

3. The heating device according to claim 1, wherein the heating element is a heating film.

4. A windscreen wiper, comprising:
the heating device support frame, and electrical connection device according to claim 1;
the longitudinal housing opening out at least at one longitudinal end of the support frame;
a recess for holding a squeegee blade; and
the squeegee blade; and
a wiper connector that is able to connect the wiper to an actuating arm of a wiper device, this wiper connector being mounted on the support frame.

5. The windscreen wiper according to claim 4, wherein the wiper connector A comprises an electrical connector and the electrical connection device.

6. The windscreen wiper according to claim 4, wherein the electrical connection device comprises a curved electrically conductive wire that forms a sliding contact and is able to cooperate with the protruding element of the heating device.

7. The windscreen wiper according to claim 4, wherein the protruding element has a width and the support frame has a longitudinal core of width B, the width A of the protruding element being less than the width B of the longitudinal core.

8. A wiper device, comprising a windscreen wiper according to claim 4.

9. A method for assembling a windscreen wiper according to claim 4, comprising:
mounting the wiper connector on the support frame of the windscreen wiper,
introducing the vertebra into the interior of the housing of the support frame, the vertebra being introduced at one of the longitudinal ends of said support frame;
longitudinally sliding the vertebra into its final position, the electrical connection device then being in electrical contact with the protruding element of the heating device.

10. The method for assembling a windscreen wiper according to claim 9, wherein the heating device is configured to:
prevent the electrical connection device from coming into contact with the heating element before the vertebra is in its final mounted position, and
bring the electrical connection device and the protruding element into contact when the vertebra is in its final mounted position.

11. The method for assembling a windscreen wiper according to claim 9, wherein the wiper connector and an electrical connector are a one-piece part, manufactured in one moulding step.

12. The heating device according to claim 1, wherein the electrical connection device is spring mounted to maintain the sliding electrical contact.

13. The heating device according to claim 12, wherein the electrical connection device is spring mounted by a curved electrical conductor.

* * * * *